United States Patent [19]
Silva

[11] 3,799,605
[45] Mar. 26, 1974

[54] STORAGE UNIT FOR PICKUP TRUCKS
[76] Inventor: Melvin W. Silva, 30000 Kasson Rd., Tracy, Calif. 95376
[22] Filed: Sept. 25, 1972
[21] Appl. No.: 292,074

[52] U.S. Cl.............................. 296/23 MC, 296/24
[51] Int. Cl............................................. B60p 3/32
[58] Field of Search ....... 296/23 MC, 24; 224/42.42

[56] References Cited
UNITED STATES PATENTS

| | | | |
|---|---|---|---|
| 2,722,352 | 11/1955 | Dehnel | 296/24 R X |
| 2,978,153 | 4/1961 | Brindle | 296/24 R X |
| 3,442,549 | 5/1969 | Granger | 296/23 MC |
| 3,567,271 | 3/1971 | Gostomski | 296/23 MC |

Primary Examiner—Philip Goodman
Attorney, Agent, or Firm—Harris Zimmerman

[57] ABSTRACT

An auxiliary storage unit for a pickup truck or the like is secured to the rear side walls of the truck. Particularly suited to a pickup truck carrying a camper, the storage unit provides additional storage volume which is exteriorly accessible without increasing the overall width of the vehicle to greater than the legal maximum. The unit is constructed of fiberglass with exterior lockable doors, and is bolted or otherwise secured to the rear outer panel of the pickup truck.

5 Claims, 6 Drawing Figures

PATENTED MAR 26 1974  3,799,605
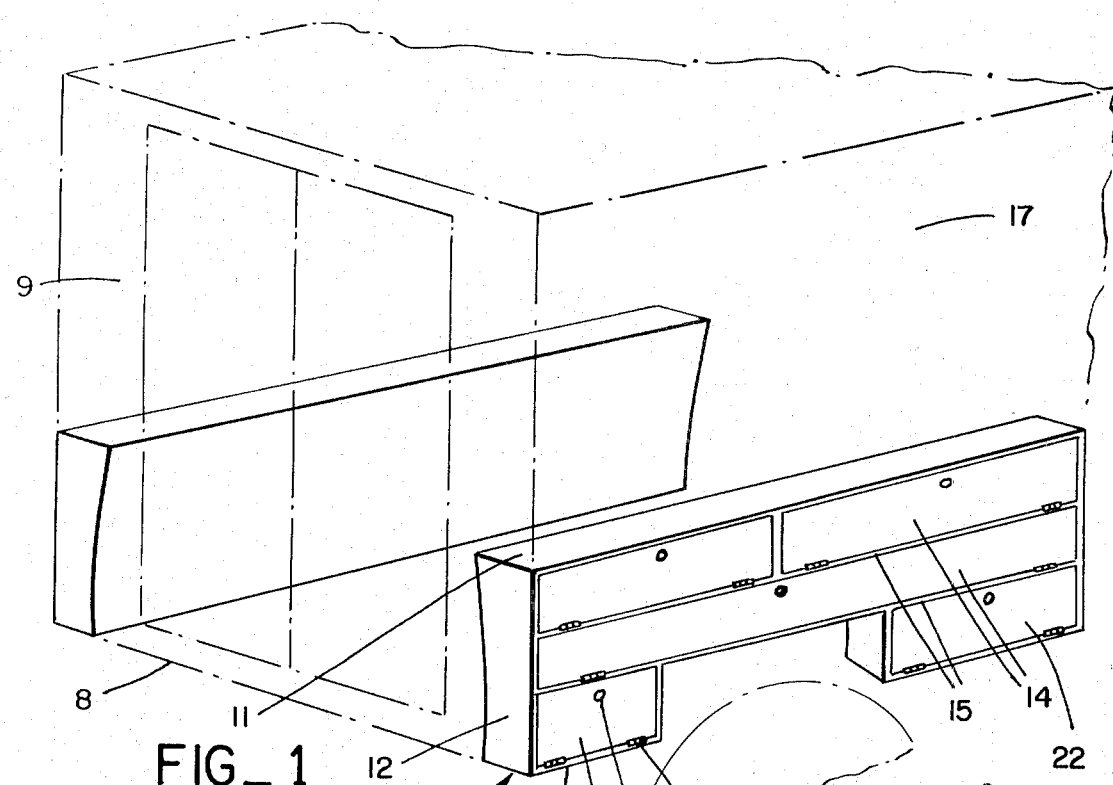
FIG_1
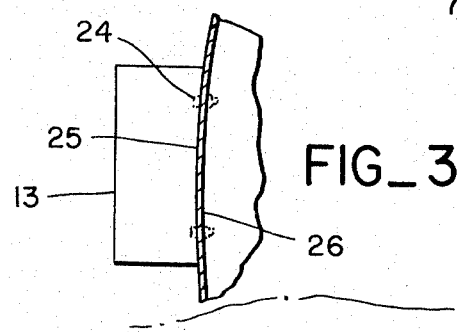
FIG_3
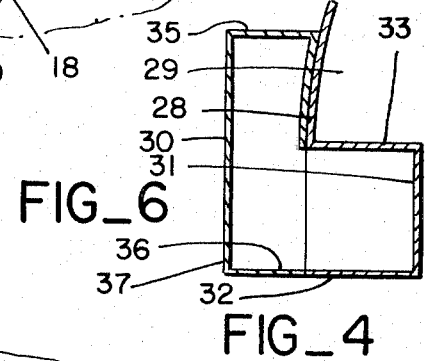
FIG_6   FIG_4
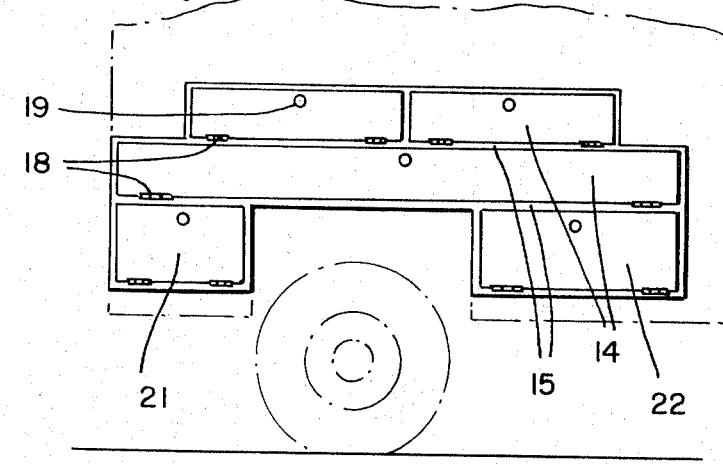
FIG_2
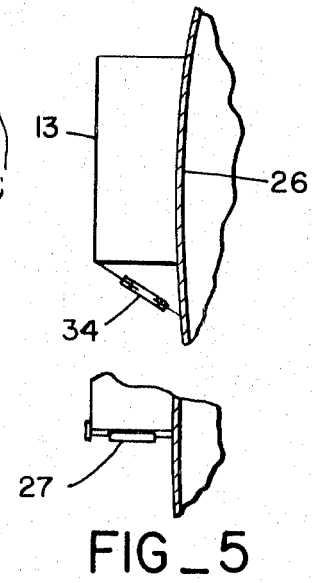
FIG_5

STORAGE UNIT FOR PICKUP TRUCKS

BACKGROUND OF THE INVENTION

The current popularity of travelling in self-contained, mobile living quarters has resulted in a recent proliferation of pickup truck-camper unit combinations of many sizes and variations. Because of the cramped nature of the accomodations within these pickup campers, a recurring and annoying problem has been the storage of not only household implements and foodstuffs, but also recreational gear, souvenirs, etc. Most often these items more than fill the limited available storage space, and are stored in the living area of the pickup camper. This practice results in the annoying problem of using the normally cramped living space of the pickup camper while a melange of miscellaneous articles cover many of the horizontal interior surfaces. Further, these messy conditions increase the difficulty of locating and using any particular desired article.

SUMMARY OF THE INVENTION

The present invention is directed to an auxiliary storage unit for a pickup camper which increases the storage capacity of the vehicle without increasing the overall width of the vehicle above the legal maximum. The storage unit is secured to the pickup truck below the camper unit on the normally unused exterior rear panel facing of the truck. Fabricated of fiberglass, the storage unit consists of a plurality of compartments for differentiated storage volumes which are accessible from the exterior by means of hinged, lockable doors. The storage unit may be secured to the truck panel by means of clamps, bolts, turnbuckles, or the like.

THE DRAWING

FIG. 1 is a perspective view of one embodiment of the present invention secured to a pickup camper vehicle.

FIG. 2 is a side view of another embodiment of the present invention.

FIG. 3 is an end view of the present invention secured to a pickup camper.

FIG. 4 is an end view of the present invention.

FIG. 5 is a detailed end view of the present invention.

FIG. 6 is an end cutaway view of a further embodiment of the present invention.

DESCRIPTION OF THE PREFERRED EMBODIMENT

The present invention may be effectively employed with both the fleet-side and step-side types of pickup trucks to provide auxiliary exterior storage capacity for the vehicle. In conventional terminology, the fleet-side type of pickup truck has a load space defined by substantially vertical, planar side walls which are disposed outwardly of the rear wheels of the truck, with re-entrant wheel wells protruding into the load space. The step-side type of pickup truck is distinguished from the fleet-side type in that the former has side walls which are disposed interiorly of the rear wheels of the truck, with wheel wells protruding exteriorly of the load space. The storage unit 7 of the present invention shown in FIG. 1 and FIG. 2 is secured to a pickup truck 8 of the fleet-side type, bearing a camper unit 9, shown in phantom. The storage unit 7 includes a top panel 11 which fits below the overhanging camper unit, end panels 12, top and bottom panels, and a curving back panel which is curved to conform to the side of the truck 8. The exterior side panel 13 of the storage unit includes doors 14 to gain entrance to the storage compartments defined by the shelves 15 and the vertical divider. The doors 14 are flush with the exterior wall 17 of the camper unit, ensuring that the storage unit will not substantially increase the overall width dimension of the vehicle, or in any event over the legal maximum width of the vehicle. The doors 14 are mounted with horizontal hinges 18, and lockably secured with locks 19 of any desired type. Depending storage compartments 21 and 22 have a gap therebetween to permit access to the rear truck wheel. As seen in FIG. 1 and FIG. 2, the storage unit includes a plurality of storage compartments of various height and length configurations to accommodate stored articles of varying sizes in an easily sortable and retrievable fashion.

The storage unit may be secured to the pickuo truck by means of bolts, as shown in FIG. 3. The bolts 24 are passed through suitable holes in the back panel 25 of the storage unit, through matching holes in the side 26 of the truck and secured with nuts. Alternatively, the storage unit may be secured to the truck by means of turnbuckles 26, as shown in FIG. 4, or clamps 27, as shown in FIG. 5.

The present invention may be effectively employed with a step-side pickup truck 28 and camper 29 as shown by the embodiment of FIG. 6. The storage unit 30 cooperates with the interior side wall 31 of the truck, as well as the top of the wheel well 32, and the protruding horizontal panel 33 to efficiently utilize the enclosed volume therein. The storage unit is formed of top panel 35, bottom panel 36, and the exterior side panel 37 to enclose the normally unused portion of a step-side pickup truck and convert it to a usable storage area. The side panel 37 may have hinged lockable doors to provide exterior access to the storage unit. Alternatively, the horizontal panel 33 may have openings formed therein to allow access to the storage compartment from within the camper unit 29 only, the exterior panel 37 having no access doors. In this configuration not only is the load space of the truck utilized most efficiently, but also the opportunity for tampering, theft or mischief is minimized. The embodiment of FIG. 6 may be secured to the truck in the same way as previous embodiments, i.e., either by bolts, clamps or turnbuckles.

It should be noted that the embodiments of the present invention may be employed effectively in combination with trucks of many descriptions carrying loads other than camper units, including, but not limited to, station wagons, deluxe pick-up trucks (such as the Ranchero made by the Ford Motor Company, and the El Camino made by the Chevrolet Division of General Motors), panel trucks, camper trucks, delivery units and camper units.

I claim:

1. An auxiliary storage unit mountable upon a pickup truck vehicle of the stepside body configuration without need for removal of a fender thereof comprising cabinet means extending longitudinally along an exterior side wall of the rear load body of said vehicle generally longitudinally below an upper edge of said wall, said cabinet including vertical end panels, a back panel adjacent the body of said vehicle, top and bottom panels, a front panel and mounting means to secure said cabinet means to said vehicle, said end panels and said front panel enclosing exteriorly-opening recesses of the body wall adjacent a wheel well of said vehicle and defining a storage space between said end panels, said front panel, and said body wall.

2. The auxiliary storage unit of claim 1, wherein said body wall of said load body includes closable apertures for gaining entry into said storage space from within said load body.

3. The auxiliary storage unit of claim 1, wherein said front panel includes hinged, lockable doors defining storage compartments within said storage space and permitting access to said storage compartments from the exterior of said load body.

4. An auxiliary storage unit for a recreational vehicle including a pickup truck of the fleet-side type of load body with a camper unit secured thereto comprising cabinet means secured to said pickup truck longitudinally below said camper unit and extending longitudinally along the exterior side of the rear load body of said vehicle, said cabinet including vertical end panels, a back panel adjacent the body of said vehicle, top and bottom panels, and a front panel defining a storage space within said panels, and mounting means to secure said cabinet means to said vehicle, said back panel of said cabinet means conforming to the curve of said exterior side of said fleet-side type of load body, and said front panel of said cabinet means being substantially coplanar with the exterior side wall of said camper unit.

5. The auxiliary storage unit of claim 4, wherein said front panel includes hinged, lockable doors defining storage compartments within said storage space and permitting access to said storage compartments.

* * * * *